United States Patent [19]
Yuen et al.

[11] Patent Number: 6,028,599
[45] Date of Patent: Feb. 22, 2000

[54] DATABASE FOR USE IN METHOD AND APPARATUS FOR DISPLAYING TELEVISION PROGRAMS AND RELATED TEXT

[76] Inventors: Henry C. Yuen, P. O. Box 1159, Redondo Beach, Calif. 90278; Daniel S. Kwoh, 3975 Hampstead Rd., La Canada/Flintridge, Calif. 91011; Roy J. Mankovitz, 18057 Medley Dr., Encino, Calif. 90278; Elsie Y. Leung, 1302 Via Del Rey, South Pasadena, Calif. 91030

[21] Appl. No.: 08/728,614

[22] Filed: Oct. 10, 1996

Related U.S. Application Data

[63] Continuation-in-part of application No. 08/475,395, Jun. 7, 1995, which is a continuation-in-part of application No. 08/424,863, Apr. 17, 1995, abandoned, which is a continuation-in-part of application No. 08/369,522, Jan. 5, 1995, abandoned, which is a continuation-in-part of application No. 08/312,863, Sep. 27, 1994, abandoned, which is a continuation-in-part of application No. 08/298,997, Aug. 31, 1994, abandoned.

[51] Int. Cl.[7] .................................................... H09Y 5/445
[52] U.S. Cl. ........................... 345/327; 348/565; 348/906
[58] Field of Search ................................ 345/327; 348/6, 348/7, 8, 10, 12, 13, 565, 567, 568, 731, 734, 906

[56] References Cited

U.S. PATENT DOCUMENTS

| | | | |
|---|---|---|---|
| 3,891,792 | 6/1975 | Kimura | 178/5.8 R |
| 4,691,351 | 9/1987 | Kayashi et al. | 380/10 |
| 4,706,121 | 11/1987 | Young | 358/142 |
| 4,729,027 | 3/1988 | Hakamada et al. | 358/183 |
| 4,734,769 | 3/1988 | Davis | 358/142 |
| 4,746,983 | 5/1988 | Hakamada | 358/183 |
| 4,751,578 | 6/1988 | Reiter et al. | 358/183 |
| 4,821,102 | 4/1989 | Ichikawa et al. | 358/183 |
| 4,873,584 | 10/1989 | Hashimoto | 358/335 |
| 4,890,168 | 12/1989 | Inoue et al. | 358/335 |
| 4,908,707 | 3/1990 | Kinghorn | 358/147 |
| 4,918,531 | 4/1990 | Johnson | 358/183 |
| 4,954,882 | 9/1990 | Kanemoto | 358/22 |
| 4,991,011 | 2/1991 | Johnson et al. | 358/141 |

(List continued on next page.)

FOREIGN PATENT DOCUMENTS

| | | |
|---|---|---|
| 444496 | 9/1991 | European Pat. Off. . |
| 447968 | 9/1991 | European Pat. Off. . |
| 488379 | 6/1992 | European Pat. Off. . |
| 497235 | 8/1992 | European Pat. Off. . |
| 178278 | 8/1991 | Japan . |
| 444475 | 2/1992 | Japan . |
| 2217144 | 10/1989 | United Kingdom . |
| 95/01059 | 1/1995 | WIPO ............................. H04N 7/16 |
| WO 95/32583 | 11/1995 | WIPO . |
| WO 95/32585 | 11/1995 | WIPO . |
| WO 96/09721 | 3/1996 | WIPO . |
| WO 96/13935 | 5/1996 | WIPO . |
| WO 96/17473 | 6/1996 | WIPO . |

OTHER PUBLICATIONS

TV Guide On Screen information sheets.
RCA Satellite Receiver User's Manual.
Panasonic TX-33A1G Operating Instructions.
Prevue Networks, Inc. promotional materials.
VideoGuide User's Manual.
StarSight Operating Guide and Quick Reference.
SuperGuide On Screen Satellite Program Guide, User's Guide Owner's Manual, and sales literature.
Rundfunktechnische Mitteilungen, vol. 30, No. 1 Jan. 1986–Feb. 1986 Norderstedt (DE).
Symposium Record Cable Sessions, "Digital On–Screen Display A New Technology for the Consumer Interface", Publication date May, 1993.

*Primary Examiner*—Nathan Flynn
*Attorney, Agent, or Firm*—Christie, Parker & Hale, LLP

[57] ABSTRACT

A database consisting of inventive data structures is used to facilitate the creation of electronic program guides when used with a television program schedule system. The database is periodically updated with television program schedule information and is interrogated by a schedule system in order to create program guides.

30 Claims, 14 Drawing Sheets

U.S. PATENT DOCUMENTS

| | | | |
|---|---|---|---|
| 4,992,782 | 2/1991 | Sakamoto et al. | 340/747 |
| 4,998,171 | 3/1991 | Kim et al. | 358/183 |
| 5,027,400 | 6/1991 | Dnji . | |
| 5,038,211 | 8/1991 | Hallenbeck | 358/142 |
| 5,040,067 | 8/1991 | Yamazaki | 358/183 |
| 5,047,867 | 9/1991 | Strubbe et al. | 358/335 |
| 5,109,279 | 4/1992 | Ando | 358/147 |
| 5,146,335 | 9/1992 | Kim et al. | 358/183 |
| 5,148,275 | 9/1992 | Blatter et al. | 358/147 |
| 5,161,019 | 11/1992 | Emanuel | 358/183 |
| 5,233,423 | 8/1993 | Jernigan et al. | 358/181 |
| 5,237,417 | 8/1993 | Hayashi et al. | 358/183 |
| 5,237,418 | 8/1993 | Kaneko | 358/183 |
| 5,247,364 | 9/1993 | Banker et al. | 358/191.1 |
| 5,253,066 | 10/1993 | Vogel | 358/188 |
| 5,285,265 | 2/1994 | Choi | 348/565 |
| 5,311,423 | 5/1994 | Clark | 364/401 |
| 5,315,392 | 5/1994 | Ishikawa et al. | 348/570 |
| 5,353,121 | 10/1994 | Young et al. | 348/563 |
| 5,390,027 | 2/1995 | Henmi et al. | 358/335 |
| 5,434,625 | 7/1995 | Willis | 348/565 |
| 5,453,996 | 9/1995 | Dureillo . | |
| 5,477,262 | 12/1995 | Banker et al. | 348/7 |
| 5,485,221 | 1/1996 | Banker et al. | 348/563 |
| 5,528,304 | 6/1996 | Cherrick et al. | 346/565 |
| 5,559,548 | 9/1996 | Davis et al. | 348/6 |
| 5,583,560 | 12/1996 | Florin et al. | 348/7 |
| 5,585,838 | 12/1996 | Lawler et al. | 348/13 |
| 5,600,364 | 2/1997 | Hendricks et al. | 348/1 |
| 5,635,978 | 6/1997 | Alten et al. | 348/7 |
| 5,666,645 | 9/1997 | Thomas et al. | 348/906 X |
| 5,760,821 | 6/1998 | Ellis et al. | 348/10 |

FIG. 2

SHOW INFORMATION PACKAGE

| |
|---|
| AMOUNT OF MEMORY USED |
| CONTROL DATE |

314:
| | |
|---|---|
| MULTIPLE SHOW FLAG | START TIME |
| DURATION ||
| THEME ||

| | | |
|---|---|---|
| CC | STEREO | ADD ONS |

| |
|---|
| TITLE LENGTH |
| TITLE |
| PRIMARY DESCRIPTION LENGTH |
| PRIMARY DESCRIPTION |
| SECONDARY DESCRIPTION LENGTH |
| SECONDARY DESCRIPTION |
| VCR PLUSCODE LENGTH |
| VCR PLUSCODE |
| END OF SHOW=NULL |

315:
| | |
|---|---|
| MULTIPLE SHOW FLAG | START TIME |
| DURATION ||
| THEME ||

| | | |
|---|---|---|
| CC | STEREO | ADD ONS |

| |
|---|
| TITLE LENGTH |
| TITLE |
| PRIMARY DESCRIPTION LENGTH |
| PRIMARY DESCRIPTION |
| SECONDARY DESCRIPTION LENGTH |
| SECONDARY DESCRIPTION |
| VCR PLUSCODE LENGTH |
| VCR PLUSCODE |
| END OF SHOW=NULL |

⋮

316:
| | |
|---|---|
| MULTIPLE SHOW FLAG | START TIME |
| DURATION ||
| THEME ||

| | | |
|---|---|---|
| CC | STEREO | ADD ONS |

| |
|---|
| TITLE LENGTH |
| TITLE |
| PRIMARY DESCRIPTION LENGTH |
| PRIMARY DESCRIPTION |
| SECONDARY DESCRIPTION LENGTH |
| SECONDARY DESCRIPTION |
| VCR PLUSCODE LENGTH |
| VCR PLUSCODE |
| END OF SHOW=NULL |

FIG.3

SHOW INFORMATION PACKAGE FEATURES

| SECONDARY DESCRIPTION LENGTH=255 |
| --- |
| SECONDARY DESCRIPTION LENGTH |
| SECONDARY DESCRIPTION |
| VCR PLUSCODE LENGTH |
| VCR PLUSCODE |
| EXTRA DATA LENGTH |
| EXTRA DATA |
| END OF SHOW=NULL |

FIG. 4

PRE-ESTABLISHED TIME LIST

| | TODAY AM | | | TODAY PM | | | TOMORROW AM | | | TOMORROW PM | | | |
|---|---|---|---|---|---|---|---|---|---|---|---|---|---|
| | 12-4 | 4-8 | 8-12 | 12-4 | 4-8 | 8-12 | 12-4 | 4-8 | 8-12 | 12-4 | 4-8 | 8-12 | |
| 1 | $A_1$ | $B_1$ | $C_1$ | $D_1$ | $E_1$ | $F_1$ | $G_1$ | $H_1$ | $I_1$ | $J_1$ | $K_1$ | $L_1$ | ← 313 |
| 2 | $A_2$ | $B_2$ | $C_2$ | $D_2$ | $E_2$ | $F_2$ | $G_2$ | $H_2$ | $I_2$ | $J_2$ | $K_2$ | $L_2$ | |
| 3 | $A_3$ | $B_3$ | $C_3$ | $D_3$ | $E_3$ | $F_3$ | $G_3$ | $H_3$ | $I_3$ | $J_3$ | $K_3$ | $L_3$ | |
| 4 | $A_4$ | $B_4$ | $C_4$ | $D_4$ | $E_4$ | $F_4$ | $G_4$ | $H_4$ | $I_4$ | $J_4$ | $K_4$ | $L_4$ | |
| ⋮ | | | | | | | | | | | | | |
| N | $A_N$ | $B_N$ | $C_N$ | $D_N$ | $E_N$ | $F_N$ | $G_N$ | $H_N$ | $I_N$ | $J_N$ | $K_N$ | $L_N$ | |

N = THE MAXIMUM NUMBER OF CHANNELS

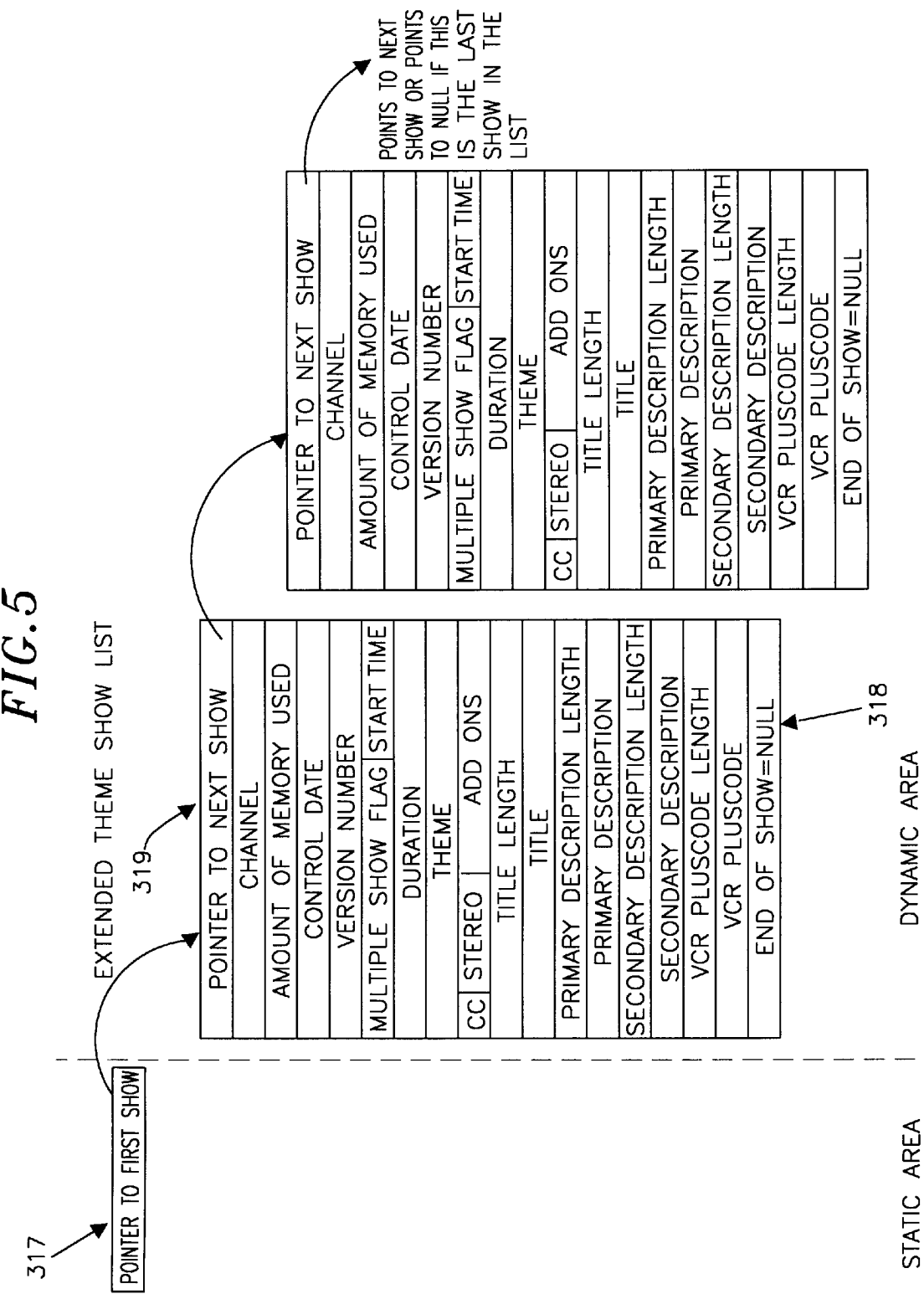

FIG. 7
320 ↘ CONTROL ARRAY

| | DISPLAY | | ADD ONS |
|---|---|---|---|
| 1 | DISPLAY | 1 | ADD ONS |
| 2 | DISPLAY | 1 | ADD ONS |
| 3 | DO NOT DISPLAY | 0 | ADD ONS |
| 4 | DISPLAY | 1 | ADD ONS |
| 5 | DISPLAY | 1 | ADD ONS |
| ... | | | |
| N | DISPLAY | | ADD ONS |

N = MAX NUMBER OF CHANNELS

FIG. 6
CHANNEL MAP

| 1 | 7 |
|---|---|
| 2 | 6 |
| 3 | 11 |
| 4 | 2 |
| 5 | 4 |
| ... | ... |
| N | 172 |

N = MAX NUMBER OF CHANNELS

FIG.9

RECORD QUEUE

| | CHANNEL | START TIME |
|---|---|---|
| 1 | CHANNEL | START TIME |
| 2 | CHANNEL | START TIME |
| 3 | CHANNEL | START TIME |
| ... | ... | ... |
| 20 | CHANNEL | START TIME |

FIG.8

CALL LETTER MAP

| 1 | K |
|---|---|
| 2 | A |
| 3 | B |
| 4 | C |
| 5 | W |
| 6 | W |
| 7 | O |
| 8 | R |
| ... | ... |
| 4N-3 | K |
| 4N-2 | T |
| 4N-1 | V |
| 4N | R |

FIG.11

THEME PRIORITIZATION

| NUMBER OF CHANNELS | TODAY | TOMORROW | PROGRAM CATEGORY SHOWS |
|---|---|---|---|
| 1-29 | ALL TITLES<br>ALL FIRST LEVEL DESCRIPTIONS<br>ALL SECOND LEVEL DESCRIPTIPONS | ALL TITLES<br>ALL FIRST LEVEL DESCRIPTIONS<br>ALL SECOND LEVEL DESCRIPTIPONS | ALL TITLES<br>ALL FIRST LEVEL DESCRIPTIONS<br>ALL SECOND LEVEL DESCRIPTIPONS |
| 30-39 | ALL TITLES<br>ALL FIRST LEVEL DESCRIPTIONS<br>ALL SECOND LEVEL DESCRIPTIPONS | ALL TITLES<br>ALL FIRST LEVEL DESCRIPTIONS | ALL TITLES |
| 40 OR MORE | ALL TITLES | ALL TITLES | ALL TITLES |

FIG. 16

MEMORY BIT MAP

|    | 7 | 6 | 5 | 4 | 3 | 2 | 1 | 0 |
|----|---|---|---|---|---|---|---|---|
| 0  | 1 | 1 | 1 | 1 | 0 | 1 | 1 | 1 |
| 1  | 1 | 0 | 0 | 1 | 1 | 1 | 0 | 1 |
| 2  | 1 | 1 | 1 | 1 | 1 | 1 | 1 | 1 |
| 3  | 0 | 0 | 0 | 0 | 0 | 0 | 0 | 0 |
| 4  | 1 | 1 | 1 | 1 | 1 | 1 | 0 | 0 |
| 5  | 1 | 1 | 1 | 1 | 0 | 0 | 1 | 1 |
| 6  | 1 | 0 | 1 | 1 | 1 | 1 | 1 | 1 |
| 7  | 1 | 1 | 0 | 0 | 0 | 0 | 0 | 1 |
| 8  | 1 | 0 | 0 | 1 | 1 | 1 | 1 | 0 |
| 9  | 0 | 1 | 1 | 1 | 1 | 1 | 0 | 0 |
| 10 | 0 | 0 | 0 | 0 | 0 | 0 | 0 | 0 |
| 11 | 0 | 0 | 0 | 0 | 0 | 0 | 0 | 0 |
| 12 | 0 | 0 | 0 | 0 | 0 | 0 | 0 | 0 |
| 13 | 1 | 1 | 1 | 1 | 1 | 1 | 0 | 1 |
| 14 | 1 | 1 | 1 | 1 | 1 | 1 | 1 | 1 |
| 15 | 1 | 1 | 1 | 0 | 1 | 0 | 0 | 0 |
| 16 | 0 | 0 | 0 | 0 | 0 | 0 | 0 | 0 |
| 17 | 0 | 0 | 0 | 0 | 1 | 1 | 0 | 1 |

DATABASE FOR USE IN METHOD AND APPARATUS FOR DISPLAYING TELEVISION PROGRAMS AND RELATED TEXT

CROSS-REFERENCE TO RELATED APPLICATIONS

This application is a continuation-in-part of application Ser. No. 08/475,395, filed Jun. 7, 1995, which is a continuation-in-part of application Ser. No. 08/424,863, filed Apr. 17, 1995, now abandoned which is a continuation-in-part of application Ser. No. 08/369,522, filed Jan. 5, 1995, now abandoned which is a continuation-in-part of application Ser. No. 08/312,863, filed Sep. 27, 1994, now abandoned which is a continuation-in-part of application Ser. No. 08/298,997, filed Aug. 31, 1994 now abandoned. The disclosures of these applications are incorporated fully herein by reference.

BACKGROUND OF THE INVENTION

This invention relates to the field of television and, more particularly, to a database for use in displaying television program information on a television screen through the use of a television program schedule system.

Television program schedule systems, such as the one disclosed in application Ser. No. 08/475,395, allow users to visually inquire into television viewing options through the use of a program guide. In these systems television program information is stored in an electronic memory connected to the television receiver. A database is used to organize and store television program information within the electronic memory.

SUMMARY OF THE INVENTION

According to the invention television program schedule data is received from the vertical blanking interval of a television signal, analyzed, and stored within a database. The database contains a static area for information which is not subject to frequent change and a dynamic area for information which will frequently change.

Within each area information is stored within data structures which enable a television program schedule system to interpret and analyze the information. The data structures are designed to facilitate the creation of program guides which display schedule information for a specific time or channel. The data structures are also designed to reduce the size of the electronic memory and to increase the efficiency of searches through the data.

The database also contains a channel map which is used to link television guide sequence numbers with data providing channel numbers and call letters. The database facilitates the of programs from a program guide through a record queue which is used to represent operator selected shows for recording. The database facilitates displays of television shows containing a selected theme through the use of an extended theme showlist which contains theme information for television shows occurring up to eight days in the future.

The database is periodically updated on a daily basis through the use of a designated data providing channel so that updated television program information is always available for operator selected program guides. In an alternate embodiment each channel provider can independently update schedule data for television programs appearing on that channel.

BRIEF DESCRIPTION OF THE DRAWINGS

The features of specific embodiments of the best mode contemplated of carrying out the invention are illustrated in the drawings, in which:

FIG. 2 is an illustration of a show information package data structure.

FIG. 3 is an illustration of a section of a show information package data structure.

FIG. 4 is a representation of the pre-established time list data structure contained in the static area of the database.

FIG. 5 is an illustration of the extended theme show list data structure.

FIG. 6 is a representation of the channel map data structure contained in the static area of the database.

FIG. 7 is a representation of the control array data structure contained in the static area of the database.

FIG. 8 is a representation of the call letter map data structure contained in the static area of the database.

FIG. 9 is a representation of the record queue data structure contained in the static area of the database.

FIG. 11 is a table illustrating the storage priority scheme employed by the database.

FIG. 16 is a representation of the memory bit map employed by the database.

DETAILED DESCRIPTION OF A SPECIFIC EMBODIMENT

Figure 1:
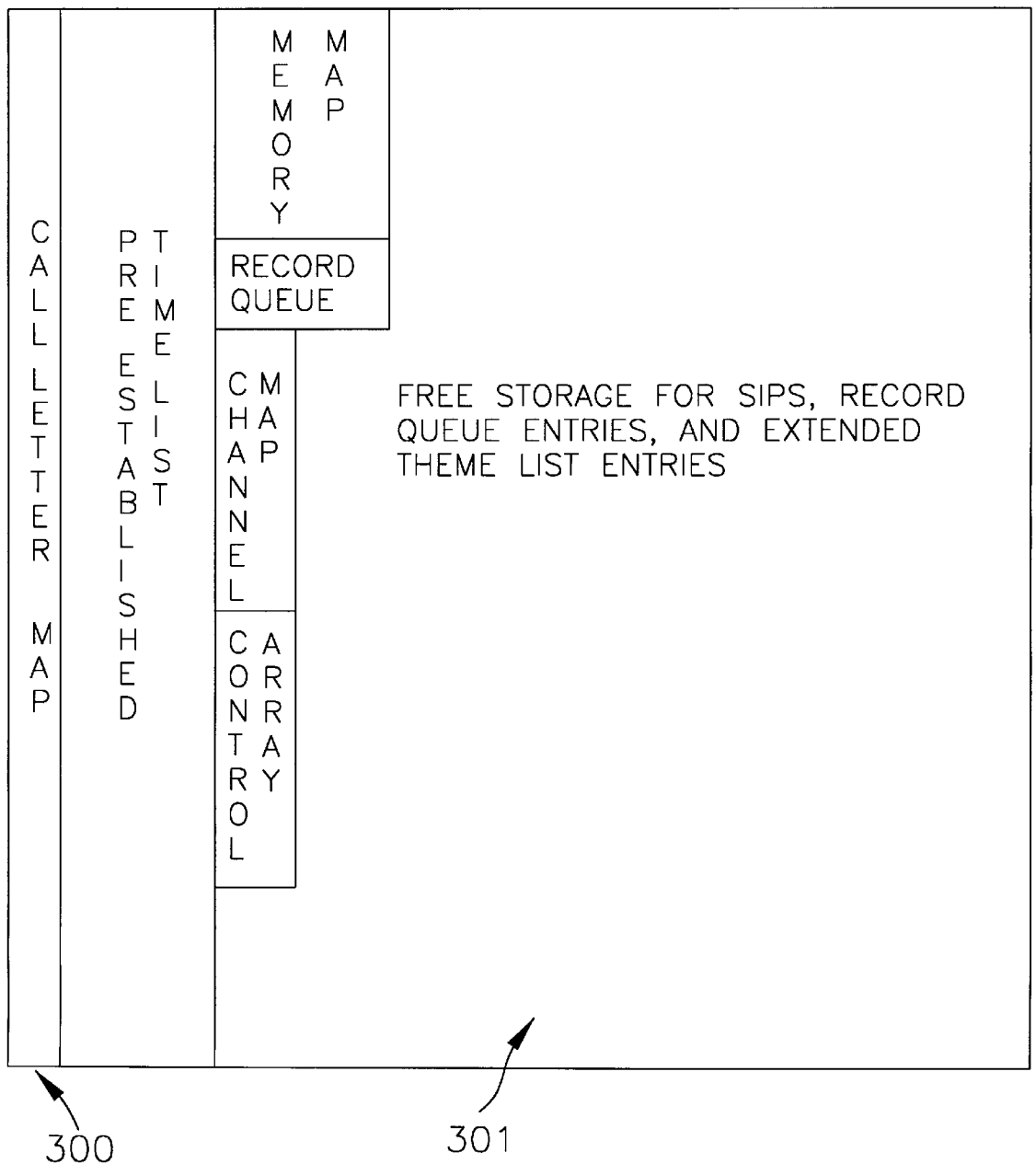
FIG. 1 is a diagram of an electronic memory that illustrates the static and dynamic areas of memory.

In the following of the embodiments of the invention, common reference numerals are used to represent the same components. If the features of all the embodiments are incorporated into a single system, these components can be shared and perform all the functions of the described embodiments.

Figure 13:
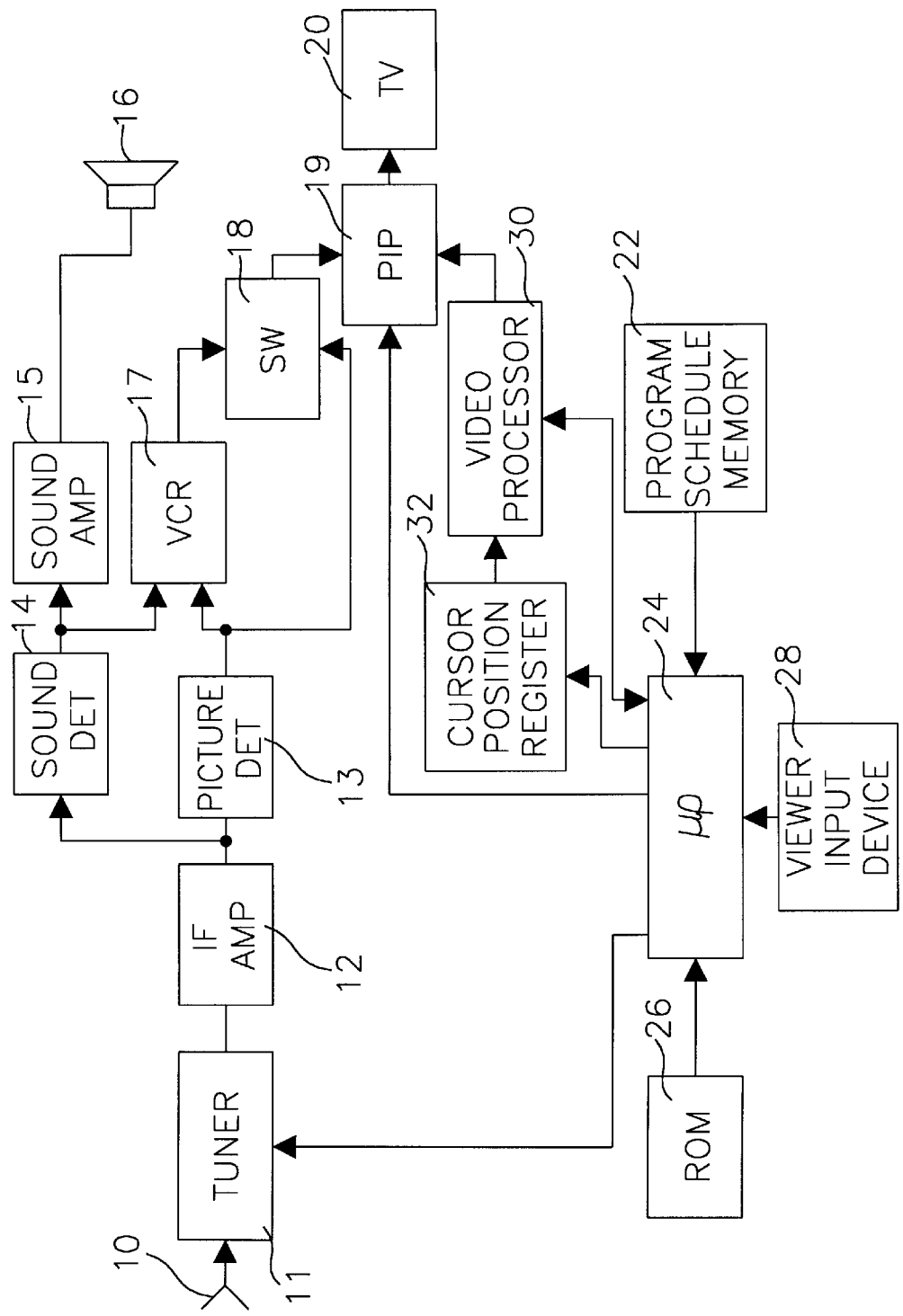
FIG. 13 is a schematic block diagram of a television receiver that has an electronic television program guide incorporating the principles of the invention.
Figure 14:
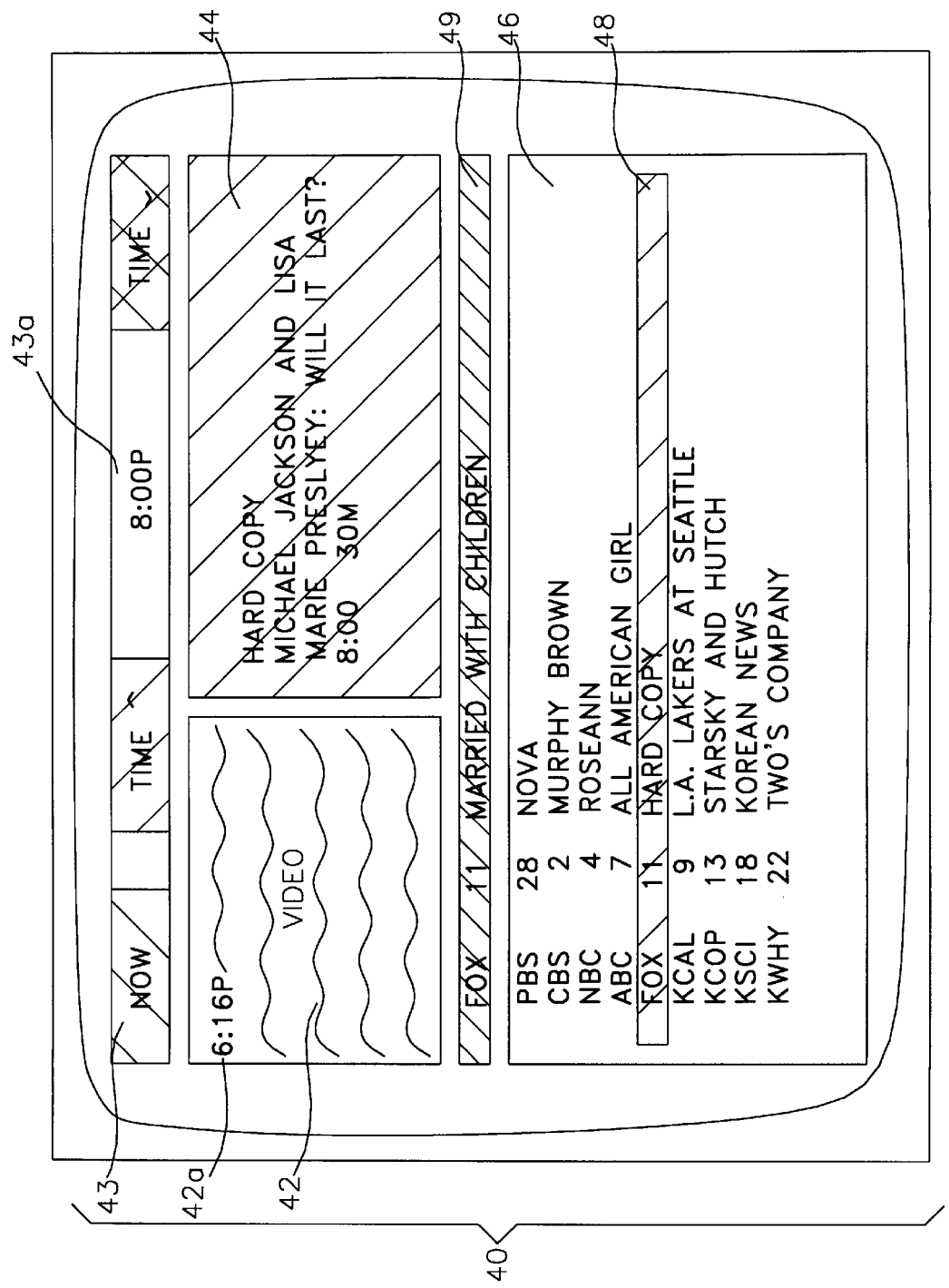
FIG. 14 is a time specific program guide generated by the principles of the invention.
Figure 15:
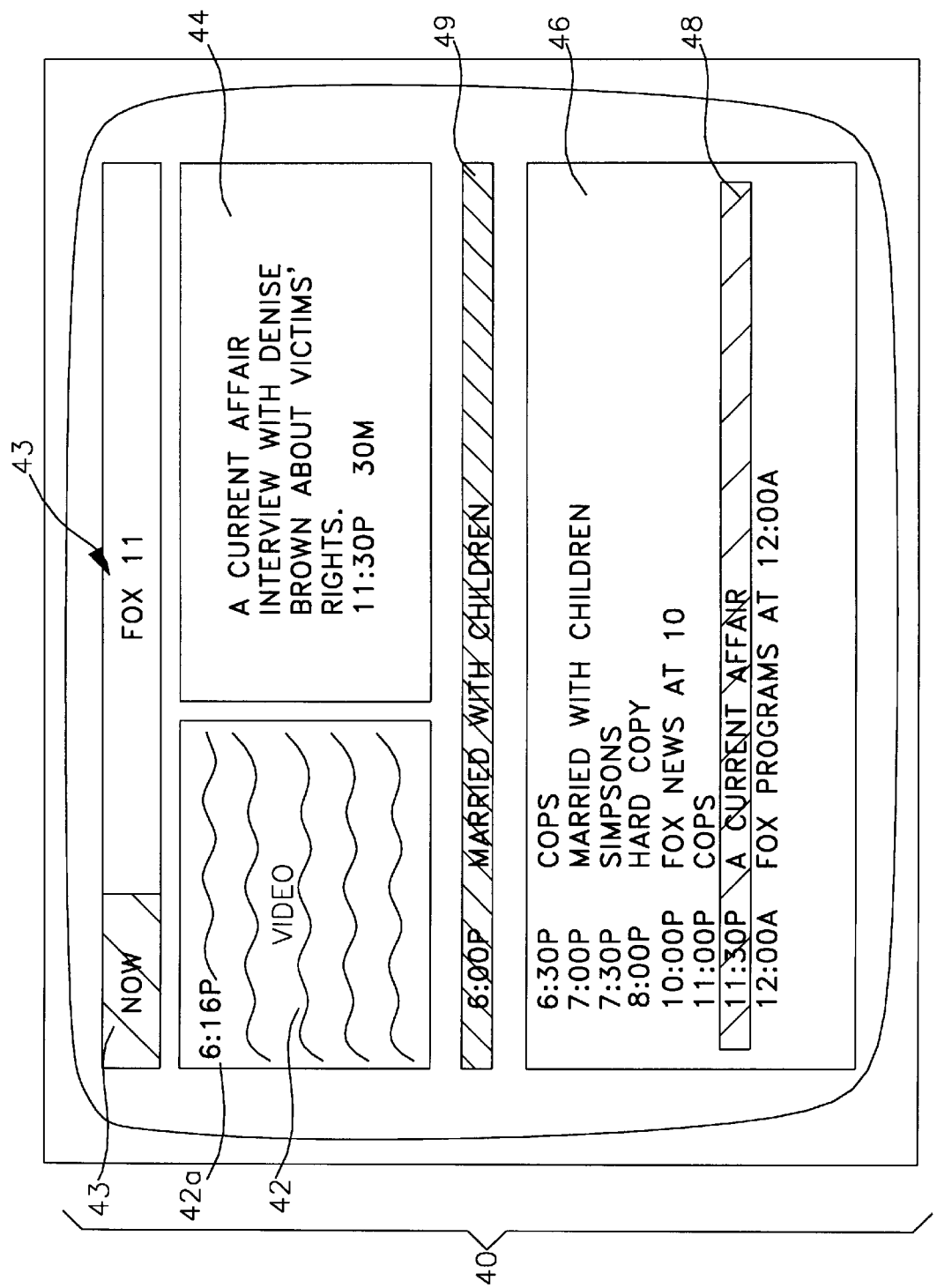
FIG. 15 is a channel specific program guide generated by the principles of the invention.

FIGS. 13 to 15 are taken from application Ser. No. 08/475,395. With reference to FIG. 13, a source of television signals 10 such as a terrestrial antenna, or a cable is connected to a television tuner 11. The output of tuner 11 is a modulated intermediate frequency signal containing video and audio television information. Tuner 11 is connected by an intermediate frequency amplifier (IF AMP) 12 to a picture detector (PICTURE DET) 13 and a sound detector (SOUND DET) 14, which produce base band video and audio signals, respectively. The audio signal is coupled by a sound amplifier (SOUND AMP) 15 to a loudspeaker 16. The video signal is coupled by a video amplifier not shown to one input of a switch 18. Sound detector 14 and picture detector 13 are connected to the audio and video inputs, respectively, of a video cassette recorder (VCR) 17. (Alternatively, television signal source 10 could be directly connected to the RF input of VCR 17, if its internal tuner and demodulating circuitry is to be utilized.) The output of VCR 17 is connected to the other input of switch 18. The output of switch 18 is connected to one input of a conventional picture-in-picture (PIP) integrated circuit chip 19. The output of PIP chip 19 is connected to the video input of a television receiver or monitor (TV) 20 having a screen (not shown).

An updatable data base of the schedule of program listings of all the available channels for a prescribed period of time, e.g. a day or a week, is electronically stored in a program schedule memory 22. These program listings typically include for each program the title, a program description, the day of the week, the start time of the day, the program length, and the channel on which the program is transmitted and thus available for reception at source 10. In a preferred embodiment of the invention, the period of time for which the program listings are stored is different for the guides, depending upon viewer priorities and preferences. For example, the information needed to display the TISPG and CSPG may be stored for one or two days and the information needed to display the TSPG may be stored for a week or more. The data base can be updated by a continuous data link in the vertical blanking interval (VBI) of one television channel broadcast to the television receiver in well known fashion. Alternatively, the data base can be updated by unplugging memory 22 and replacing it with a memory having the updated data base. Memory 22 is connected to a microprocessor 24 that is programmed to control the operation of the described equipment. An operating program for microprocessor 24 is stored in a read only memory (ROM) 26. A viewer input device 28, preferably in the form of a remote IR controller, is coupled to microprocessor 24 to provide commands from the viewer. A video processor 30 is coupled to microprocessor 24. When the viewer wishes to see television program listings, microprocessor 24 recalls a portion of the program schedule data base from memory 22 and couples it to video processor 30, where the program listings are formatted for display. Preferably, the information stored in video processor 30 is a bit map of what is displayed on the screen of television receiver 20. Video processor 30 is connected to the other input of PIP chip 19. Preferably, viewer input device 28 controls microprocessor 24 by cursor movement on the screen of television receiver 20. To this end, microprocessor 24 and video processor 30 are coupled to a cursor position register 32. (Alternatively, the viewer can select items of information displayed on the screen by keying into viewer input device 28 code numbers assigned to these items.) Microprocessor 24 is also coupled to tuner 11 for channel change, to VCR 17 for play/record selection and start/stop, to switch 18 for selection of one of its inputs, and to PIP chip 19 for selection of the mode of PIP operation.

Several formats of the electronic program guide are shown in FIGS. 14 and 15. Each format has a background area 40 and an overlaid PIP window 42 in the upper left-hand corner of the screen. The real time, i.e., 6:15 p.m., is displayed in a sub-area 42*a* PIP window 42. Background area 40 includes a banner and message prompting area 43 at the top of the screen, a program description area 44 in the upper right-hand corner of the screen adjacent to PIP window 42, and a program schedule area 46 below areas 42 and 44. Program description area 44 includes the start time and length (duration) of the program being described. The viewer can move a cursor 48 vertically to highlight one of the program listings displayed in area 46. The highlighted background of cursor 48 and the background of program description area 44 are the same color or shade. In each format, the complete, moving images of a currently broadcast television program in real time and the current time are displayed in PIP window 42 and the audio portion of the television program displayed in PIP window 42 is reproduced by the sound system of monitor 20. The information displayed in areas 43, 44, and 46 varies depending upon the format.

In FIG. 14 a time specific program guide comprising listings of programs being broadcast at a specific future time, i.e., 8:00 p.m., is displayed in area 46. The viewer can select the time of the program listings to be displayed at intervals such as one-half hour. The selected future time, i.e., 8:00 p.m., for the program listings displayed in area 46 is shown in a sub-area 43*a* of area 43. A brief program description of the program listing highlighted in area 46 by cursor 48 is displayed in area 44. The current program being broadcast remains displayed in PIP window 42, and a banner 49 which identifies the current program by channel name, channel number, and program title is displayed between PIP window 42 and area 46 on a background having a different color or shade than cursor 48.

In FIG. 15, a channel specific program guide comprising listings of programs being broadcast on a specific channel is displayed in area 46. All the program listings for a selected channel, i.e., FOX Channel 7, are displayed in area 46, from the currently broadcast program into the future for a specified time period, e.g., 24 hours or until the end of the next day. Area 46 has a column for time and a column for program title; each line of area 46 represents a separate program listing. The moving, real time images of the current television program are displayed in PIP window 42. If the cursor also highlights the current program, a brief program description of the current program is displayed in area 44. If the cursor highlights another program listing, as shown in FIG. 4, a brief program description of the highlighted program is displayed in area 44 and the current program is identified in banner 49 by time and title.

All four areas of background 40 are formatted in video processor 30. The memory space of video processor 30 corresponding to the area in which PIP window 42 appears on the screen is left blank; i.e., although overlaid on background area 40, PIP window 42 does not cover up any of the information of background area 40. By means of a pair of up/down arrows on viewer input device 28, the viewer can move a cursor 48 vertically to highlight the listing of one of the currently playing television programs displayed in area 46. Preferably, to reduce delays in displaying the program schedules, all the program listings for the particular screen format are stored in video processor 30, even though only a fraction of them are displayed at the same time. When the cursor reaches the top or bottom listing in area 46, microprocessor 24 recalls further program listings from video processor 30 for display on the screen of television receiver 20.

Preferably, two levels of detail are available for the program description. Normally, the first level detail of the program description is displayed in area 44 as described above. When more detail is desired, the viewer operates input device 28 to display a second level detail of the program description. There are two options for the display of the second level detail. As one option, the second level detail can replace the first level detail in area 44. This has the advantage that the program listings can continue to be seen by the viewer while more detail about the program description is displayed. As the other option, the second level detail can replace the program listings in area 46. This has the advantage that more space is available to display the second level of detail than the first level.

In the preferred embodiment, a television program schedule system ("schedule system") contains a database used to store all the information needed to create program guides and to carry out user requests, such as requests to record specific future programs. The database is stored in a memory accessible by the schedule system microprocessor.

The database contains a static area and a dynamic area. The static area contains several fixed tables used to store data not subject to frequent change such as the call letters for each received channel. The dynamic area is used to store data which is frequently updated such as the actual television program schedule data. Partitioning memory into static and dynamic areas provides for efficient database operation because each area of memory (static or dynamic) can be addressed separately leading to smaller address sizes and faster searches. The partitioning also allows for efficient memory management as only the dynamic area, 301, would need to be pruned.

FIG. 1 depicts the television program schedule database. Static area 300 contains the call letter map, the pre-established time list, the channel map, the control array, the memory map, the record queue, the theme category table and a pointer to the extended theme show list. These structures will be described in greater detail below. Dynamic area 301 is used to store television program schedule data that falls within a two day window (today and tomorrow) and television program schedule data containing theme information that falls within an within an eight day window. This data takes the form of show information packages (SIPs) and extended theme show list entries. These structures are also described more fully below.

In alternate embodiments the database could be expanded to contain three or more days of program schedule data. The number of days for which program schedule data is stored will of course impact on the size of the memory needed and the processing speed of the schedule system.

DATA STRUCTURES

Data in television schedule database is stored in data structures. The data structures enable a schedule system to interpret the data stored therein. Several of the data structures have a fixed size and reside in the static area 300. Other data structures are of variable size and reside in the dynamic area 301. The fixed data structures include: the pre-established time list, the channel map, the control array, the call letter map, the memory map, the record queue and the extended theme showlist pointer. The variable data structures include: the show information packages and the extended theme show list.

Show Information Packages

Show information packages are variable length data structures that contain actual television program schedule data. Each show information package contains data for a four hour block of television programming for a specific channel. The show information package size is variable because the number of shows in any four hour block will depend on the duration of each individual show. For example a four hour block may contain: eight—half hour shows, two—two hour movies, four—one hour shows, one—two hour movie and four—half hour shows, etc.

FIG. 2 depicts a show information package. A show information package contains two general data fields which refer to the entire package. These are: amount of memory—used to determine how much space is needed to store the show information package and control date—used to determine whether the data in a specific show information package is for the current day, the next day, or outside of the current two-day window.

Following the general data is specific data for each show that fits within the four-hour time block. For a given show, represented by block 314, the following fields are present in the show information package: multiple show flag field—used to determine if this show is the last show within the package, or if there are other shows following this show in the four hour block; start time field —contains an offset from the start time of the four-hour block, this offset is added to the time of the four-hour block to determine the start time of the show; duration field—specifies the air time for the show; theme field—contains information on the type of show; for example, the show may be a sporting event, a news program, or a movie; CC field determines whether or not the show is closed captioned; stereo field—determines whether or not the show is broadcast in stereo; add-ons field—is an extra field for expansion, this field may contain other information about the show (i.e. rating of the show) as that information becomes standard in the art. In alternative embodiments a variety of other information can be included for each show.

Following these fields are fields representing program title, primary description—a short description of the program, secondary description—a longer description of the program and VCR+PLUSCODE. Each of these items are represented by two separate fields, one containing the length of a specific item, such as title length, and one containing the item itself, such as title. The length fields are used to determine how many of the following bytes comprise the data item. For example if the secondary description length field is 40 bytes, the schedule system will know that the next forty bytes comprise the secondary description.

Following this information is an end-of-show field. The end-of-show field is used to indicate that the information for that particular show is finished. A show information package may contain information for one or more shows depending on how many shows are broadcast within the four hour block. The presence of multiple shows is represented by 315 and 316.

A show information package is structured so as to provide several unique features for storing data. The title length, primary description length, secondary description length and VCR+PLUSCODE length fields can be expanded for values that are too large to fit within one byte. For example, referring to FIG. 3, if the secondary description length is greater than 255 (the maximum length value that can be stored within one byte), the length byte is set to 255 (the maximum value). Setting the length byte to the maximum value indicates that the following byte is also a length byte and the two bytes should be added to determine the length of the secondary description. In this way, a show information package can be used to dynamically allocate space to accommodate longer descriptions or longer titles.

The end-of-show field allows for the inclusion of data in the show information package that is not read by a current version of a schedule system but may be utilized by for later versions. As shown again in FIG. 2, following the VCR+PLUSCODE field, there are two fields of unspecified data. This is data which may be read by future versions of a schedule system but is currently not processed. When processing show information package data, a schedule system will discard this data until it reads an end-of-show field. The schedule system will not begin processing data for a new show until an end-of-show field is found. This feature allows a schedule system to access the same data as a different schedule system which may incorporate other information besides title, description, etc.

Pre-established Time List

The pre-established time list is used to locate television program information for each channel in the schedule system within a two day window. Television programming schedule data is located through the use of pointers which contain addresses of show information packages where the data is stored. Each pointer points to one show information package containing a four hour block of schedule data. The pre-established time list contains twelve pointers for each channel and therefore can reference 48 hours (today and tomorrow) of program schedule data. In alternate embodiments where schedule data is stored for more then two days the pre-established time list would contain a sufficiently larger number of pointers.

FIG. 4 illustrates the pre-established time list, which is a grid of times and channels. A designated location in static area 300 is assigned to each telecast time and channel. Specifically, four hour blocks of telecast time are designated by base letters A–L and telecast channels are designated by subscripts 1–N. The pre-established time list contains a set of twelve pointers 313 for each channel in the schedule system. Each pointer corresponds to a show information package that contains data for a four hour block of television programming. For example, in FIG. 4, the pointer E1 corresponds to program data from four p.m. to eight p.m on the first channel. Twelve pointers represent 48 hours of programing information (24 hours for the current day and 24 hours for the next day).

Referring to FIG. 4, pointers A2 through L2 are used to represent the program data associated with the second channel in the schedule system. Each pointer contains an address, in dynamic area 301, of a show information package of variable length containing actual television program data. When searching for specific television schedule data, the schedule system first looks in the pre-established time list to secure the appropriate pointer, then uses the address found in that pointer to determine where the data is stored. For example if data for the second channel in the schedule system is needed for a television program between eight p.m. and twelve midnight the schedule system will use the address in pointer F2 to determine the location in dynamic area 301 of the show information package containing the associated data.

In summary, the address of the show information package of a given television program is stored in static area 300 in a location assigned to the telecast time and channel of that program, e.g., the address of the show information package of a program to be telecast between eight p.m. and twelve midnight on the second channel is stored in location F2. The address of the show information package of a program provides access to the title of the program.

Extended Theme Showlist

Television programming information for shows corresponding to a predetermined theme (movie, sporting event, etc.) that have a start time beyond the current two day window (i.e. shows that will air after tomorrow) are stored in the extended theme show list. These shows are stored for up to eight days in the future. The extended theme show list is a linked list of data items. Each data item contains information for one television show.

The extended theme show list is depicted in FIG. 5. The address 317 of the first show in the list 318 is stored in static area 300. Show 318 is stored in dynamic area 301 and contains a pointer 319 to the next show. The linked pointing scheme is repeated for all shows in the list. The pointer field in the last show contains the value "NULL" to indicate that there are no other shows in the list. Because each show in the list is linked to the next show, an entire list can be traversed by ascertaining the address of the first show in the list. This address is easily accessible as it is always located in the same place in static area 300.

Each show in the extended theme showlist contains the same field format as shows in show information package 314 with the exception that the channel ID is stored for each extended theme showlist show. The conventions applying to show information package 314 that allow for extending the length fields and for placing additional data before the end-of-show flag also apply in the extended theme show list.

Channel Map

The database also contains a channel map located in static area 300. The channel map, depicted in FIG. 6, links the television programming provider channel number with the internal channel number. For example, in FIG. 6, channel 7 is assigned to internal channel 1 and channel 11 is assigned to internal channel 3. The channel map is used to identify the provider channel number when creating a program guide display.

Control Array

The database also contains a fixed control array located in static area 300. The control array is used by a schedule system to identify channels which have been inhibited for display by the user. The control array is depicted in FIG. 7. For each channel, a display field 320 is set to "1" if the channel is to be displayed and set to the "0" if the channel is to be inhibited. Referring to FIG. 7, channels 1, 2, 4, and 5 will be displayed in a program guide while channel 3 will be inhibited.

There is also a field for each channel for additional "add-on" information. This field allows for the addition of other user controlled functions in future versions of a schedule system such as a specified time period for inhibiting display of a channel.

Call Letter Map

The database also contains a call letter map located in static area 300. The call letter map links the call letters corresponding to a television provider with the internal guide channel. For example, in FIG. 8, the call letters KABC are linked to internal channel 1 and the letters WWOR are linked to internal channel 2. The call letter map is used to identify provider channel call letters for display in a program guide.

Record Queue

User requests for recording future programs are stored in the record queue. The record queue is a fixed length table of twenty entries located in static area 300. The record queue is depicted in FIG. 9.

Each entry in the queue contains the channel that the show will air on and the start time of the show. The record queue is structured so that programs are in time sequence order. That is, the first item in the list will be broadcast earlier than any of the other items, and so on. This structure eliminates the need to search the record queue in order to find the next program for recording.

Data Transmission

Television schedule data is continuously transmitted to the database from the vertical blanking interval (VBI) of the data provider channel. In order to receive schedule data the television must be tuned to the data provider channel. For example, if the data provider channel is channel 7, the television must first be tuned to channel 7 before schedule data can be received. The schedule system attempts to receive data from the provider channel four times a day.

Because a user may be watching a different channel when the schedule system attempts to download data, a download is attempted four times in an effort to ensure the database receives a complete set of data. The four download attempts are spaced six hours apart over a 24-hour period to provide a high probability that during one of those attempts a user will not have the television tuned to another channel. For example, download attempts may occur and twelve midnight, six a.m., twelve noon, and six p.m. It is unlikely that someone will be watching television at all four of these times.

In an alternate embodiment schedule data updates can occur on an individual basis for each channel. Each channel provider can supply schedule updates in the VBI signal for that channel. When the user selects a channel for display the schedule system can interrogate the VBI on that channel and receive schedule updates.

The entire dynamic area 301 is erased before the first download of the day. This complete erasure ensures that all data for shows that have already aired is removed from the schedule system.

All television program data is sent and received in download packets. The download packet is comprised of the schedule information, along with a header which contains routing data, enabling the schedule system to determine how to store the contents of the packet.

Figure 10:
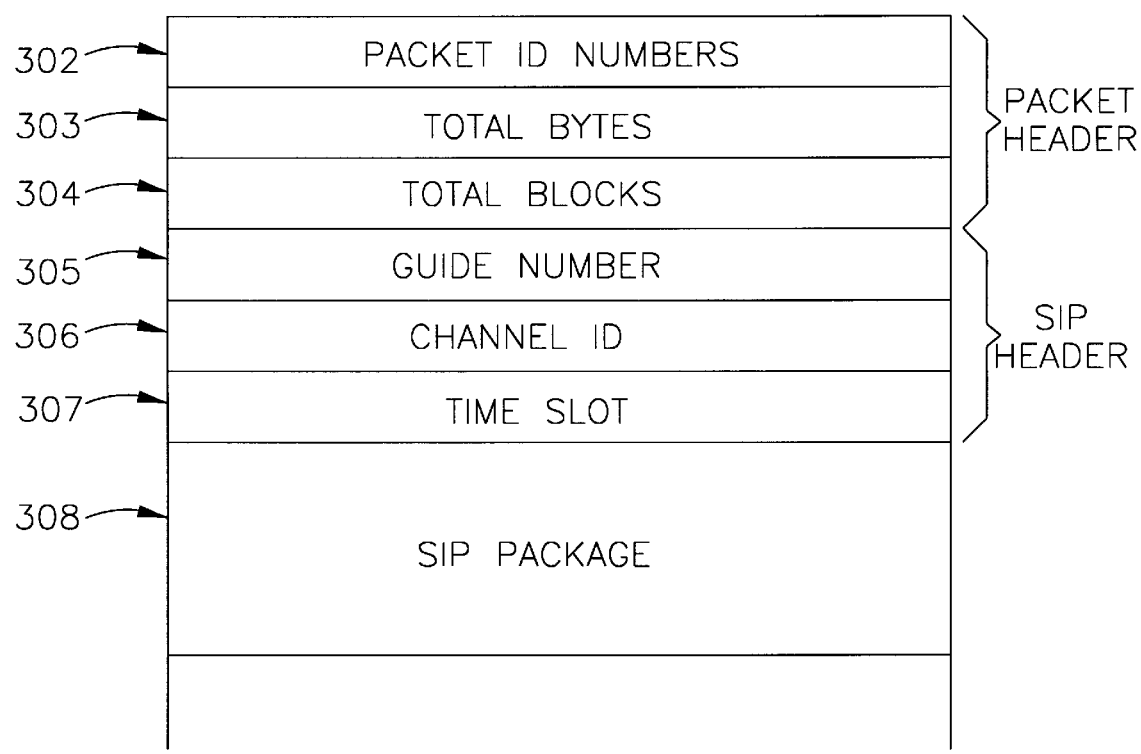
FIG. 10 is a diagram of the download packet received by the database.

FIG. 10 illustrates a download packet. The packet begins with a packet header containing packet ID number 302 used to distinguish this packet from other packets. The packet header also contains number of bytes 303 and number of blocks 304. These values are used to determine the size of the packet.

The packet header is followed by the show information package (SIP) header. There is a show information package header for each show information package in the packet. The SIP header contains: guide number 305 which specifies the internal channel number of the data in the show information package; channel ID 306 which specifies the source of the data in the show information package; and time slot 307 used to designate the time of day of the data in the show information package. A show information package 308 follows the SIP header.

Upon receipt, a show information package is extracted from the download packet and temporarily stored in memory. The show information package contains a control date field that is used to determine if the data is for the current day(today), the next day(tomorrow) or for some time in the future. The show information package header contains a guide channel field that specifies the internal channel number for the data.

Before new show information packages are stored, a check is made to determine if the internal channel number in the show information package header corresponds to a channel which is enabled for display. If the internal channel does correspond to an enabled channel the control date is checked. If the package falls within the current two day window the package is stored and the address of the show information package is placed in the appropriate pointer in the pre-established time list. The time slot field in the SIP header is used to identify the appropriate pointer location in the pre-established time list. If the show information package is outside of the current two-day window (today and tomorrow)and the show information package contains programs that correspond to a predetermined theme, those programs with theme information are extracted from the show information package and placed in the extended theme show list. The guide number is extracted from the SIP header and appended to the show before it is placed int he extended theme show list. If the show information package is outside of the current two-day window and does not contain theme information, the show information package is discarded.

The schedule system contains a memory prioritization scheme to efficiently use the memory space available. The scheme is outlined in FIG. 11. The prioritization scheme is keyed to the number of channels that are selected for display. If the operator has selected twenty-nine or less channels for display, all titles, first level descriptions and second level descriptions for programs that fall within the 2-day window are stored. Further, all extended theme data, including title, first level and second level descriptions, are also stored.

If the user has selected over 30 channels for display, but less than 39 channels, all shows that will air on the current day are stored with title, first level and second level descriptions. All shows broadcast for the second day, however, will only be stored with the title and the first level description. Extended theme shows will only be stored with their titles. If the operator has selected over 40 channels for display, only titles are stored.

Sorting the Extended theme Showlist

Figure 12:
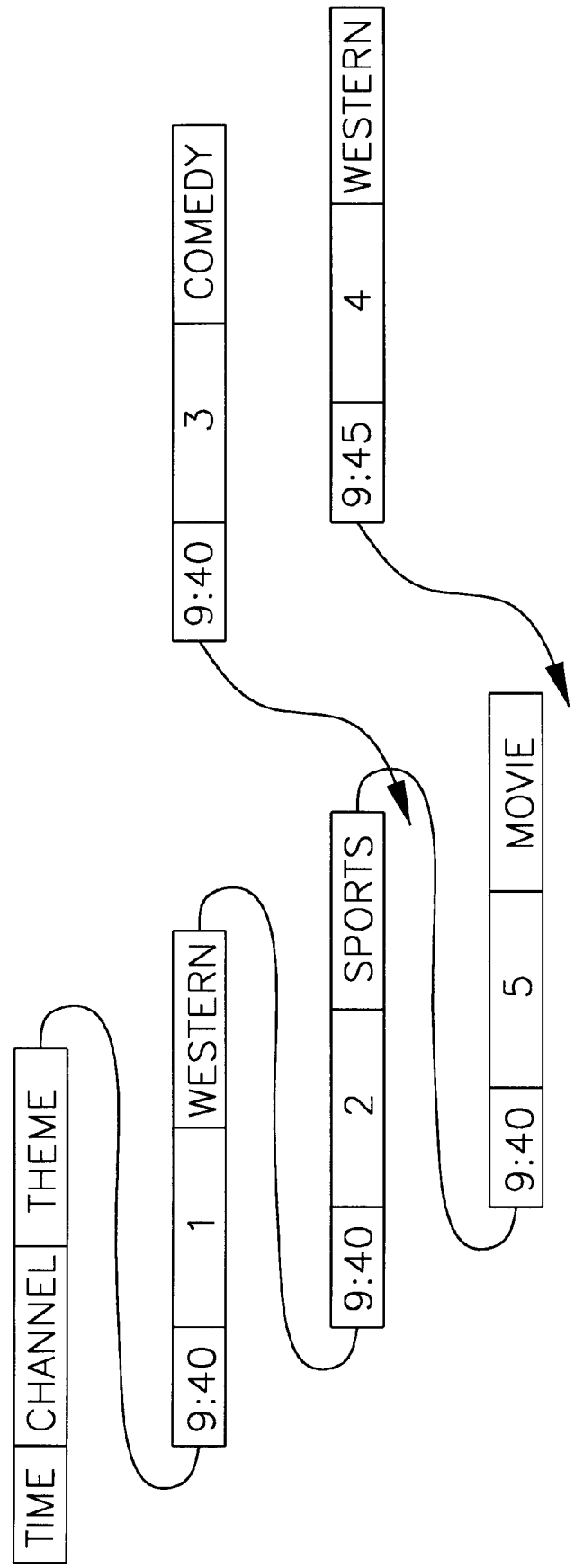
FIG. 12 depicts the process of sorting the extended theme showlist data structure upon receipt of new data.

As shows are received with theme data that fall outside the 2-day window, they are added to the extended theme show list. When a new show is added to the extended theme show list, the extended them show list is sorted by start time so that shows with earlier times are placed at the beginning of the extended show list and shows with later times are placed at the end of the extended theme show list. FIG. 12 depicts the sorting scheme of the extended show list.

Specifically, shows are sorted by time and internal channel number. Shows at the earliest time on the lowest number internal guide channel are first in the list. The list proceeds on time and channel such that shows on the last guide channel at the latest time are last in the list. This sorting, which occurs upon storage, expedites theme displays because when the list is searched for theme data the results are already properly ordered for display.

Memory Management

The database includes a memory bit map in order to track the parts of dynamic area 301 that are currently holding program data as opposed to the parts of the program schedule memory that are free to store new program data. The memory bit map divides the memory into 32 byte blocks. Each block is represented by a bit in the memory bit map.

The memory bit map is depicted in FIG. 15. Each bit in the map 310 represents a 32 byte block of memory. A "1" in the bit position 311 indicates that program data is stored in that block. A "0" in the position 312 indicates that the block is free. When new data is to be stored, a search can be made through the memory bit map to locate a sufficient number of free positions in which to store the data. When the positions are located, the data is stored and the corresponding numbers in the memory bit map are changed from "0" to "1" to indicate that those memory locations are occupied.

For example, referencing FIG. 13, if data is received that requires ten blocks of storage, a schedule system will scan the memory map and store the data in the space represented by bits 0–7 in row 3 and bits 0–1 in row 4. These bits will then be set to "1" in the memory bit map.

A schedule system can also periodically re-order the memory so that free space is grouped contiguously. For example, referencing FIG. 13, the data starting in the block represented by bit 2 in row 0 and ending in the block represented by bit 1 in row 1 would be slid over to the block represented by bit 3 in row 0. This will remove the "0" gap in row zero. This process is repeated throughout the memory map so that all free space is grouped together at the end of memory.

As previously stated, all the information in dynamic area 301 is cleared out once a day. This process ensures that the database does not contain data which is more than one day old. A schedule system can also prune data to remove data for shows that have already aired. This pruning is accomplished by searching through show lists in dynamic area 301 to identify shows that have start times that have occurred before the current time. Data for any of these identified shows is removed from the database, and a garbage collection routine would secure the memory that contained these old shows by changing the appropriate bits in the memory bit map.

The schedule system may also remove data for channels which have been disabled. For example, if the operator disables a channel for display, the schedule system can delete any program schedule data for that channel. The garbage collection routine will then secure the memory space that was represented by shows for the deleted channel. If the operator were to select the channel for display again the schedule system would have no data for that channel until the next update period.

Database Processing

Interaction between the database and a television program schedule system is illustrated through the following examples.

a. The operator requests a time specific program guide (TISPG), the current time is 7 p.m.

When the user requests a TISPG for information pertaining to television shows that are currently being broadcast, the schedule system first reads the current time (7 p.m.) from a microprocessor clock. The schedule system then determines the pointers that correspond to current time in the pre-established time list, FIG. 4. Since the current time is 7 p.m. the schedule system will look to the fifth pointer (this pointer corresponds to the data from 4 p.m. to 8 p.m.) for each channel: Channel 1-E1, Channel 2-E2, Channel 3-E3, . . . , Channel N-EN.

For each pointer the schedule system accesses the associated show information package, FIG. 2. The schedule system adds the start time of the four hour block (4 p.m.) to the time offset in each show in the show information package to determine the show that is currently airing on that channel. Information for the show is then extracted from the show information package. The extracted information includes title, primary description, secondary description and VCR+PLUSCODE.

Internal channel numbers are also used to index into the channel map, FIG. 6. Specifically, the channel number is used to select a specific source channel ID for display in the guide: Channel 1-7, Channel 2-6, Channel 3-11, . . . Channel n-172. The internal channel number is also used to index into the call letter map, FIG. 7. Specifically, the internal channel number is used to pull out the station identification call letters for display in the guide: Channel 1—KABC, Channel 2 —WWOR, . . . Channel 3—KTVR. All of the information from the show information package, the channel map and the call letter map is used to create formatted text lines for display in a guide.

b. The operator requests a channel specific program guide (CSPG), the current channel being viewed is channel 6, the current time is 3 p.m.

When the user requests a CSPG for information pertaining to television shows that are airing or will be broadcast on a specific channel (e.g., channel 6) at a specific time (e.g., 3 p.m.) the schedule system determines the channel number corresponding to the displayed channel by interrogating a system variable. For this example the channel is channel 2. The schedule system then reads the current time (3 p.m.) from a microprocessor clock. The schedule system determines the pointer that corresponds to current time for the selected internal channel in the pre-established time list, FIG. 4. Since the current time is 3 p.m. and the selected internal channel is channel 1 the schedule system will look to the fourth pointer (this pointer corresponds to the data from 12 noon to 4 p.m.) in the second set of pointers. This pointer is D2, FIG. 4.

The schedule system then accesses the associated show information package, FIG. 2, for pointer D2. The schedule system adds the start time of the four hour block (12 noon) to the time offset in each show in the show information package to determine the show that is currently airing. Information for the show is then extracted from the show information package. The extracted information includes title, primary description, secondary description and VCR+PLUSCODE. The schedule system extracts data for all shows in the show information package pointed to by D2 that occur after the selected show. Information is then extracted for all shows in show information packages pointed to by pointers E2–L2.

The internal channel number is also used to index into the channel map, FIG. 6. Specifically, the internal channel number is used to pull out the specific source channel ID, channel 6, for display in the guide. The internal channel number is also used to index into the call letter map, FIG. 7. Specifically, the internal channel number is used to pull out the station identification call letters, WWOR, for display in the guide. All of the information from the show information package, the channel map and the call letter map is used to create formatted text lines for display in the guide.

c. The operator requests a theme specific program guide (THSPG),the selected theme is "MOVIE" the current time is 10:30 a.m.

When the user requests a THSPG for information pertaining to television shows having a specific theme (MOVIE) that are airing or will be broadcast, the schedule system first reads the current time (10:30 a.m.) from a microprocessor clock. The schedule system then determines the pointers that correspond to current time in the pre-established time list, FIG. 4. Since the current time is 10:30 a.m. the schedule system will look to the third pointer (this pointer corresponds to the data from 8 a.m. to 12 noon) for each channel: Channel 1—C1, Channel 2—C2, Channel 3—C3, . . . , Channel N—CN.

For each pointer the schedule system accesses the associated show information package, FIG. 2. The schedule system adds the start time of the four hour block (8 a.m.) to the time offset in each show in the show information package to determine the show that is currently airing on that channel. Once the show that is currently airing is determined the schedule system compares theme information for that show with the selected theme, "MOVIE". If the show is a movie, information for the show is extracted from the show information package. The extracted information includes title, primary description, secondary description and VCR+PLUSCODE.

The schedule system then increments the current time by five minutes (10:35) and repeats the above process. The clock is incremented again by five minutes and the process is repeated until the clock time is at the end of the four hour block, i.e. 12 noon. The schedule system then access all remaining pointers in like manner, D1—DN, E1—EN, . . . L1—LN, and extracts information for all shows that contain the theme "MOVIE".

Once data has been extracted for all shows occurring within the two day window (today and tomorrow) that contain the theme "MOVIE" the schedule system begins extracting data from the extended theme show list, FIG. 5. The schedule system has the address of the first entry in the extended theme show list since it is stored in static area 300. Data for all shows in the extended theme show list which correspond to the theme "MOVIE" are extracted.

Inhibiting Channels

The control array, FIG. 7, provides the capability to block channels for display. Blocking a channel inhibits the channel from being displayed on a schedule system, therefore the channel would not be part of the TISPG, CSPG, or THSPG.

When the user selects a channel for non-display, the display flag in the control array is set to "0". Whenever the schedule system user requests a program guide display, the schedule system first checks the control array before proceeding with processing on the pre-established time list. If the control array for a specific channel is set to "0" no other processing is performed for that channel and the schedule system goes on with the next channel. If the user were to re-select that channel for display in subsequent processing, the schedule system would enact the change the next time a program guide was created.

The control array may also be used to inhibit the storing of data for selected channels. For example, a television program schedule system could first check the control array before storing data for a specific channel. If the control array for a specific channel contained a "0" no data corresponding to that channel would be stored. Note that a channel may be inhibited for display as described above without necessarily blocking the storage of data.

Recording

When the user selects a program for recording the schedule system stores the channel number of the selected program and the program start time in the record queue, FIG. 9. The program start time is computed by adding the offset contained in the show information package to the start time of the associated four hour block of data.

The record queue is put in time order whenever a new entry is added. This ordering facilitates periodic polling of the start time in the first show of the queue to determine the next recording command to be executed. The address of the queue is easily accessible as it is stored in static area 300. After a show is recorded the next show in the queue is moved to the beginning of the queue.

What is claimed is:

1. A method for displaying television program information comprising the steps of:

storing in electronic memory electronic program guide information including for each television program, title, start time, and regional channel name;

storing in electronic memory a channel map that links channel names with local channel numbers;

selecting a particular on-screen guide for display;

retrieving from electronic memory electronic program guide (EPG) information required to display the selected on-screen guide, including title, start time, and regional channel name;

retrieving from electronic memory the local channel number linked to each regional channel name retrieved from electronic memory;

displaying the retrieved titles, start times, regional channel names, and the local channel numbers as the selected on-screen guide.

2. The method of claim 1, additionally comprising the step of transmitting the EPG information in the VBI of a telecast signal telecast throughout the region, the step of storing EPG information comprising downloading from the VBI the transmitted EPG information of the telecast signal.

3. The method of claim 2, additionally comprising the step of transmitting channel maps for a plurality of geographic areas in the VBI of the telecast signal, the step of storing a channel map that links channel names with local channel numbers comprising downloading from the VBI the channel map applicable where the displaying step us performed.

4. Apparatus for displaying television program listings on the screen of a monitor comprising:

a memory having a first area in which the titles of television programs to be telecast are stored at specified addresses and a second area in which the specified addresses of the titles are stored in a grid of times and channels, a designated location in the second area being assigned to each telecast time and channel such that the address of the title of a program is stored in the location designated for the telecast time and channel of that program;

means responsive to a request to display a program guide for scanning the locations of times of a channel in the second area to retrieve the addresses stored therein;

means for retrieving the titles at the addresses in the first area;

means for composing program listings from the retrieved titles and the times for display on the screen; and means for coupling the composed listings to the screen.

5. The apparatus of claim 4, additionally comprising:

means responsive to a request to display a program guide for scanning the locations of channels at a time in the second area to retrieve the addresses stored therein;

means for retrieving the titles at the addresses in the first area;

means for composing program listings from the retrieved titles and the channels; and means for displaying the composed listings on the television screen.

6. The apparatus of claim 5, in which the scanning means scans the locations in the second area consecutively in order of their time locations.

7. The apparatus of claim 6, in which the scanning means scans the locations in the second area consecutively in order of their channel locations.

8. The apparatus of claim 4, in which the scanning means scans the locations in the second area consecutively in order of their time locations.

9. The apparatus of claim 4, in which additional information about the television programs is stored at the respective addresses in the first area.

10. The apparatus of claim 9, in which additional information about the television programs stored at the respective addresses in the first area includes primary descriptions of the programs.

11. The apparatus of claim 10, in which additional information about the television programs stored at the respective addresses in the first area additionally includes secondary descriptions of the programs.

12. The apparatus of claim 4, additionally comprising a display monitor with a screen for receiving and displaying the composed listings on the screen.

13. Apparatus for displaying television program listings on the screen of a monitor comprising:

a memory having a first area in which the titles of television programs to be telecast are stored at specified addresses and a second area in which the specified addresses of the titles are stored in a grid of time and channels, a designated location in the second area being assigned to each telecast time and channel such that the address of the title of a program is stored in the location designated for the telecast time and channel of that program;

means responsive to a request to display a program guide for scanning the locations of channels of a time in the second area to retrieve the addresses stored therein;

means for retrieving the titles at the addresses in the first area;

means for composing program listings from the retrieved titles and the channels for display on the screen; and means for coupling the composed listings to the screen.

14. The apparatus of claim 13, in which the scanning means scans the locations in the second area consecutively in order of their channel locations.

15. The apparatus of claim 13, in which show data items for a particular theme are stored in the first area of the memory, the address of one of the show data items to be telecast is stored in a designated location in the second area, and each show data item includes the address of another show data item to be telecast so as to link the show data items for the theme to each other.

16. The apparatus of claim 13, in which the scanning means scans the locations of channels at a specific time, the composing means composes time specific program listings, and the displaying means displays a time specific program guide.

17. The apparatus of claim 13, in which additional information about the television programs is stored at the respective addresses in the first area.

18. The apparatus of claim 17, in which additional information about the television programs stored at the respective addresses in the first area includes primary descriptions of the programs.

19. The apparatus of claim 18, in which additional information about the television programs stored at the respective addresses in the first area additionally includes secondary descriptions of the programs.

20. The apparatus of claim 13, additionally comprising a displaymonitor with a screen for receiving and displaying the composed listings on the screen.

21. Apparatus for displaying television program listings on the screen of a monitor comprising:

a memory having a first area in which show data items for a particular theme are stored, each show data item including the address of one of the other show data items to be telecast so as to link the show data items for the theme to each other and a second area in which the address of one of the show data items to be telecast is stored in a designated location;

means responsive to a request to display a theme specific program guide for retrieving the address in the designated location of the second area;

means responsive the address in the designated location for retrieving the addresses of the remaining show data items;

means for retrieving the show data items;

means for composing theme specific program listings from the retrieved show data items for display on the screen; and means for coupling the composed listings to the screen.

22. The apparatus of claim 21, in which the means for retrieving the addresses of the remaining show data items retrieves the show data items in the order in which they are to be telecast.

23. The apparatus of claim 21, in which the means for retrieving the show data items retrieves the show data items in the order in which they are to be telecast.

24. The apparatus of claim 21, in which each show data item in the first area includes the address of the next show data item to be telecast so as to link the show data items for the theme to each other in the order in which they are to be telecast and the address of the show data item to be telecast first is stored in the designated location of the second area.

25. The apparatus of claim 21, additionally comprising a display monitor with a screen for receiving and displaying the composed listings on the screen.

26. A method of storing show data items in a memory for display on a television screen, the method comprising the steps of:

transmitting to the memory show data items each representing a time period, a channel, and a title of a program to be telecast during the time period on the channel;

storing the title of each show data item at a specific address in a first area of the memory; and storing the specific address at a location in a second area of the memory assigned to the telecast time and channel represented by the show data item.

27. The method of claim 26, in which the transmitting step transmits show data items that also represent a program theme, the method additionally comprising the steps of:

storing the address of the next show data item to be telecast in the first area of the memory as part of each show data item that also represents a theme so as to link the show data items for the theme to each other; and storing the address of the show data item that also represents the theme to be telecast first in a designated location in the second area of the memory assigned to the theme.

28. A method of displaying internal television channel numbers in an electronic program guide (EPG) comprising the steps of:

storing in memory an EPG identifying television programs by title, provider channel designation, and time of telecast;

storing in memory a table that links internal channel numbers and provider channel designations;

selecting from the EPG television programs meeting one or more criteria;

recovering from memory the title, provider channel designation, and time of telecast of programs meeting the one or more criteria;

recovering from memory the internal channel number of each provider channel designation recovered from memory; and displaying the title, internal channel number, and time of telecast of each of the selected programs.

29. The method of claim 28, additionally comprising the steps of storing in memory a table that links internal channel numbers and call letters and recovering from memory the call letters of each internal channel number recovered from memory; and the displaying step also displays the call letters.

30. The apparatus of claim 4, in which the scanning means scans the locations of times of a specific channel, the composing means composes channel specific program listings, and the displaying means displays a channel specific program guide.

* * * * *

UNITED STATES PATENT AND TRADEMARK OFFICE
CERTIFICATE OF CORRECTION

PATENT NO. : 6,028,599
DATED : February 22, 2000
INVENTOR(S) : Henry C. Yuen, Daniel S. Kwoh, Roy J. Mankovitz and Elsie Y. Leung It is certified that error appears in the above-identified patent and that said Letters Patent is hereby corrected as shown below:

Column 14,
Line 9, replace "step us" with -- step is --.

Column 15,
Line 42, replace "displaymonitor" with -- display monitor --.
Line 56, after "responsive" insert -- to --.

Signed and Sealed this

Thirtieth Day of July, 2002

*Attest:*

*Attesting Officer*

JAMES E. ROGAN
*Director of the United States Patent and Trademark Office*